United States Patent [19]

Argue

[11] Patent Number: 5,709,254
[45] Date of Patent: Jan. 20, 1998

[54] TREE HARVESTING APPARATUS

[76] Inventor: Fletcher Argue, P.O. Box 509, Plaster Rock, New Brunswick, Canada, E0J 1W0

[21] Appl. No.: 666,603

[22] Filed: Jun. 18, 1996

[51] Int. Cl.$^6$ .................... A01G 23/08; B27B 17/14
[52] U.S. Cl. .................... 144/34.1; 144/4.1; 144/336; 30/386
[58] Field of Search .................... 144/4.1, 34.1, 144/24.13, 336, 338, 339; 30/382, 383, 384, 385, 386

[56] References Cited

U.S. PATENT DOCUMENTS

| | | |
|---|---|---|
| 2,667,902 | 2/1954 | Whiteside . |
| 2,668,566 | 2/1954 | Goodlet . |
| 3,343,575 | 9/1967 | Trout .................... 144/34.1 |
| 3,389,728 | 6/1968 | Galis .................... 144/34.1 |
| 3,461,928 | 8/1969 | Siiro . |
| 3,542,099 | 11/1970 | Gibson .................... 144/4.1 |
| 3,866,320 | 2/1975 | Progl .................... 30/386 |
| 4,273,168 | 6/1981 | Propst .................... 144/4.1 |
| 4,326,570 | 4/1982 | Fridley et al. .................... 144/34.1 |
| 4,413,661 | 11/1983 | Marchildon .................... 144/24.13 |
| 4,486,953 | 12/1984 | Halverson .................... 30/385 |
| 4,766,939 | 8/1988 | Forslund .................... 144/24.13 |
| 4,779,653 | 10/1988 | Denis .................... 144/24.13 |
| 4,781,518 | 11/1988 | Paavila .................... 414/724 |
| 4,800,936 | 1/1989 | Pomies et al. .................... 144/4.1 |
| 4,848,424 | 7/1989 | Wiemeri et al. .................... 144/34.1 |
| 4,881,582 | 11/1989 | Ketonen .................... 144/24.13 |
| 4,919,175 | 4/1990 | Samson .................... 144/24.13 |
| 4,960,157 | 10/1990 | Sheets .................... 144/34.1 |
| 5,103,881 | 4/1992 | Johnson .................... 144/34.1 |
| 5,109,900 | 5/1992 | Gilbert .................... 144/24.13 |
| 5,201,350 | 4/1993 | Milbourn .................... 144/24.13 |
| 5,291,926 | 3/1994 | Jansson .................... 144/34.1 |
| 5,345,686 | 9/1994 | Zimmermann .................... 30/386 |
| 5,355,920 | 10/1994 | Tanguay .................... 144/24.13 |
| 5,390,715 | 2/1995 | Luscombe .................... 144/24.13 |
| 5,396,705 | 3/1995 | Leini .................... 30/386 |
| 5,445,197 | 8/1995 | Larsson .................... 144/34.1 |
| 5,528,835 | 6/1996 | Ra .................... 30/386 |

FOREIGN PATENT DOCUMENTS

WO87/05184  9/1987  WIPO .

*Primary Examiner*—W. Donald Bray
*Attorney, Agent, or Firm*—Paul Sharpe; McFadden, Fincham

[57] ABSTRACT

There is disclosed a tree harvesting apparatus which provides a helical spline for permitting movement of a harvesting head about a central vertical axis thereof. This provides enhanced manoeuverability of the head to prevent damage to saplings or other immature timber. A chain saw chain detensioning system is also disclosed. The system permits a quick removal of a saw chain from the chain saw without the use of tools therefore is more easily changed in an expedited manner.

16 Claims, 4 Drawing Sheets

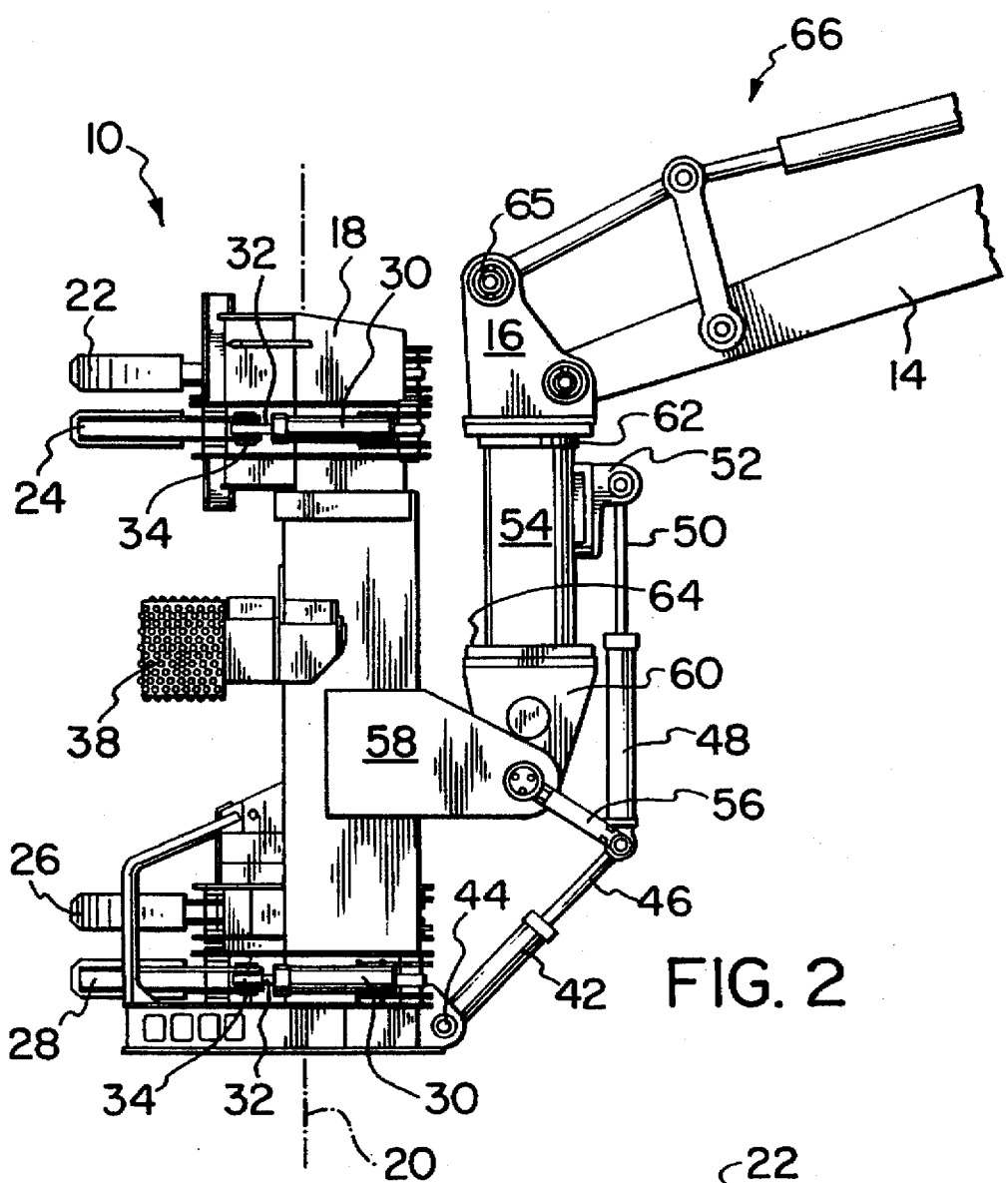
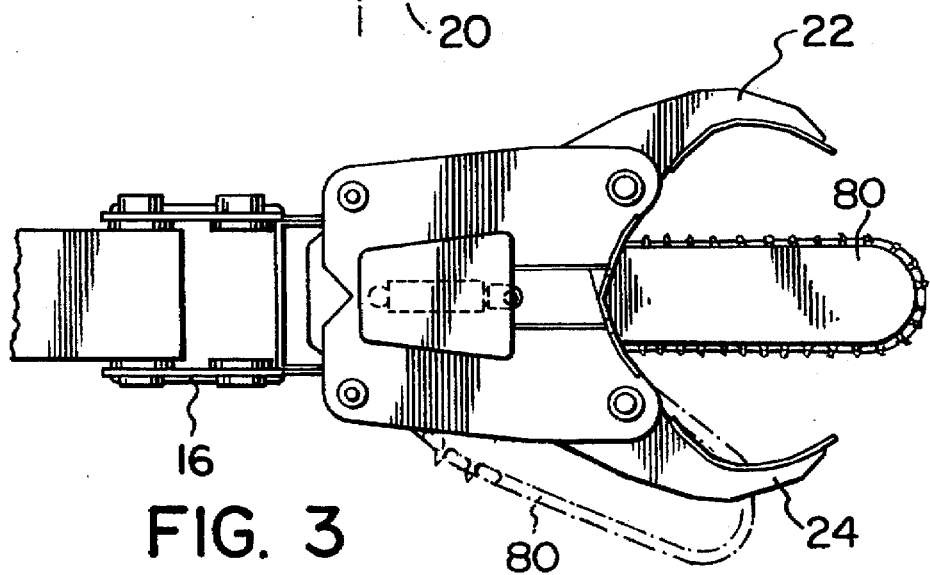
FIG. 2
FIG. 3

TREE HARVESTING APPARATUS

FIELD OF THE INVENTION

The present invention is directed to a tree harvesting system and more particularly, the present invention is directed to a highly manoeuverable tree harvesting system.

BACKGROUND OF THE INVENTION

Tree handling and felling apparati are well known in the art and have been proposed with many different improvements.

As an example, U.S. Pat. No. 4,273,168, issued Jun. 16, 1981 to Propst, discloses an apparatus and method for harvesting trees. The arrangement provides a gripping means and means for limbing a tree. These functions are quite important to the processing of the timber, however, manoeuverability of the apparatus would appear to be limited.

Siiro, in U.S. Pat. No. 3,461,928, issued Aug. 19, 1969, discloses a tree harvester having gripping means and limbing means as well as tree cut-off means. The apparatus is linked to a tractor-type vehicle via a plurality of linkages. The arrangement is useful for processing trees, however, manoeuverability again would appear to be limited to horizontal and vertical movement of the tree processing portion of the apparatus and manoeuverabilty afforded by the vehicle.

In U.S. Pat. No. 4,766,939, issued Aug. 30, 1988, to Forslund provides an assembly for limbing trees. The arrangement is provided with the typical tree gripping elements, drive means for driving the arrangement along the tree stem, and as well provides a rotation feature for rotating the entire assembly about a horizontal axis. Means are provided for connecting the assembly to a suitable vehicle.

Regarding the tree cut-off member or chain saw, one of the difficulties in the art is to provide an arrangement which can easily correct for fluctuations in the saw chain length due to stretching. This is an important feature and in tree harvesting systems, it is desirable to have an arrangement which expeditiously tightens the chain. Many advances have been made in the art with respect to chain saw tensioning means and one such arrangement is set forth in U.S. Pat. No. 3,866,320, issued Feb. 18, 1975, to Progle. This arrangement provides a series of helical gears to effect the tension adjustment of the saw chain.

Another variation on the apparatus is shown in U.S. Pat. No. 5,345,686, issued Sep. 13, 1994, to Zimmerman. In the Zimmerman arrangement, the tensioning device is integrated into the guide bar. The tensioning device holds a sprocket drive wheel facing from the end face of the guide bar. Although the arrangement is useful, it does not appear capable of providing a constant force, but rather would appear to be limited to the resiliency of this spring member.

Halverson, in U.S. Pat. No. 4,486,953, issued Dec. 11, 1984, discloses a chain saw bar with automatic tensioning. The arrangement relies on the use of a bifurcated saw bar in order to house the members for effecting the tensioning. This is advantageous since the saw bar must be fairly rigid to be useful where high forces are experienced in felling timber. Further, this arrangement includes a significant number of moving parts and this leads to difficulties when it is required to either change the saw bar or the blade, since such removal is labour intensive.

In view of the limitations in the various elements in the tree harvesting art, it would be desirable to have an arrangement having a high degree of manoeuverability and employing quickly repairable elements. The present invention is directed to satisfying these needs.

SUMMARY OF THE INVENTION

One object of the present invention is to provide an improved tree harvesting system.

A further object of the present invention is to provide an improved quick change chain saw employable with a tree harvesting system.

A further object of the present invention is to provide a chain saw comprising: a chassis;
 a saw bar extending from said chassis;
 a saw chain positioned about said saw bar;
 adjustable tensioning means for adjustably effecting axial movement of said bar relative to said chassis to adjust the tension of said saw chain on said saw bar; and
 fluid control valve means operatively connected to said tensioning means to actuate said tensioning means.

The chain saw tensioning arrangement as set forth herein may be employed in typical hand-held chain saw systems or may be incorporated into tree harvesting systems. The arrangement has been found to be particularly advantageous since the tension on the chain is maintained via the saw bar, which, in turn, is maintained by the fluid valve system. This ensures a constant force on the saw chain. The result of this is a long lasting saw chain which is not subject of premature wear.

As a further convenience, it has been found that by providing grooved or shiplapped supporting blocks for the saw bar, which shiplapped blocks are received in guide members on the chassis of the saw, prevents axial movement of the saw bar from occurring, which, in turn, attributes to the efficiency and overall smooth running and lifespan of the saw arrangement. Additionally, it has been found that by incorporating this indirect mounting system achieved by the above-mentioned arrangement, the noise factor is significantly reduced. Furtherstill, the arrangement, affords quick removal of the saw bar from the chassis and this is equally true of the saw chain from the bar.

It has been found that by making use of the fluid control valve arrangement, the constant force can be maintained on the saw bar which, in turn, provides a constant force on the saw chain. To further complement the structural arrangement, it has been found that by making use of an indirect connection of the drive shaft to the sprocket of the chain saw, significant forces otherwise realized by the motor, are reduced. To this end, bearings may be incorporated on the drive shaft to provide an indirect connection from the motor spindle to the drive shaft and subsequently to the sprocket of the chain saw.

A further object of the present invention is to provide a tree harvesting system for felling and shaping trees, the apparatus attachable to the end of a support arm, comprising:
 a main processing head for felling and shaping a tree;
 a mounting member connected to the main processing head; and
 selectively pivotal linkage means extending between the main processing head and the mounting member, the linkage means operable for selective pivotal movement of the main processing head about an axis parallel to the main support head; and
 means for connection of the apparatus to a source of fluid.

A still further object of the present invention is to provide a tree harvesting system, comprising:

a main tree processing head having a central axis and means adapted for connection of the head to a vehicle;

the main processing head including:

tree gripping means;

tree de-limbing means;

means for advancing a tree relative to the main processing head;

selectively operable chain saw cutting means mounted to a chassis on the main tree processing head;

the chassis having a saw bar and a saw chain therearound;

tensioning means for moving the saw bar relative to the chassis to effect tensioning of the saw chain;

fluid control valve means operatively connected to the tensioning means to effect movement of the saw bar;

a mounting member connected to the main processing head; and selectively operable pivotal linkage means extending between the main processing head and the mounting member, the linkage means selectively operable to effect pivotal movement of the main processing head about an axis parallel to the central axis of the main processing head; and means for connection of the main processing head to a source of fluid.

By making use of the rotary actuator, there is a significant degree of freedom available with the tree harvesting head in the present invention. By providing the ability to pivot the tree harvesting head at the sight of connection where the arrangement is connected to a carrier vehicle, i.e. boom, etc., infinitely more freedom is afforded to the operator since the head can be moved from side to side in order to avoid the destruction of saplings and to gain access to timber in difficult or hard to reach areas. This is in marked contrast to those systems proposed in the art which either provide a rotatable head about a horizontal axis or rely on the connection of the boom to the vehicle to provide for swaying or side to side motion. These arrangements are quite limited in their manoeuverability and as set forth herein previously, all result in significant damage to immature timber.

Having thus described the invention, reference will now be made to the accompanying drawings illustrating preferred embodiments.

BRIEF DESCRIPTION OF THE DRAWINGS

FIG. 2 is an enlarged view of the tree harvesting head;

FIG. 3 is a top plan view of the head shown in FIG. 2 with parts removed for clarity;

Similar numerals in the drawings denote similar elements.

DETAILED DESCRIPTION OF THE PREFERRED EMBODIMENTS

Figure 1:
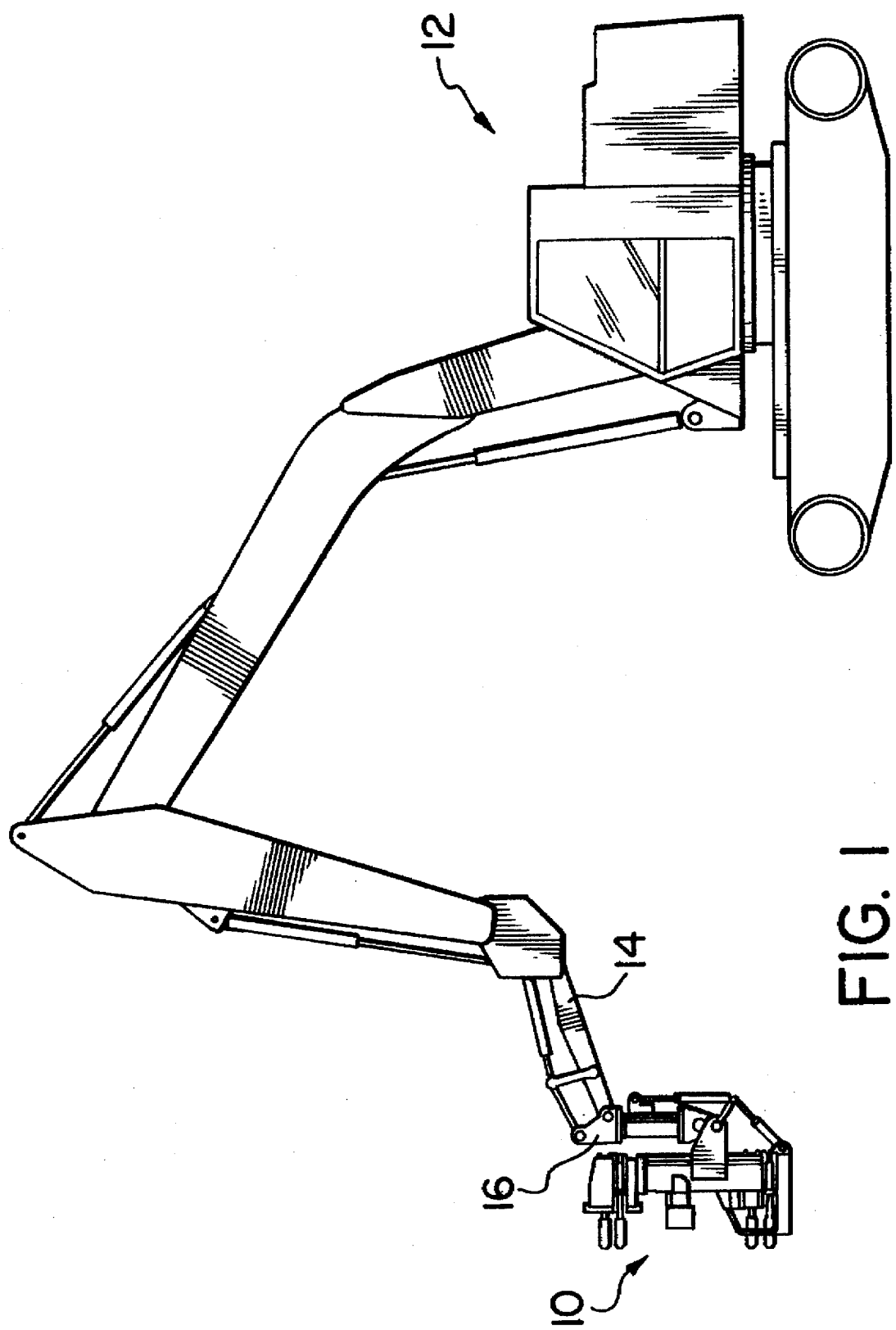
FIG. 1 is an overall perspective view of the tree harvesting system as connected to a vehicle.

Referring now to FIG. 1, shown is a perspective view of one embodiment of the tree harvesting apparatus, globally denoted by numeral 10, as attached to a vehicle 12. The vehicle 12 includes a main boom 14 movable as is well known in the art, which boom is connected to the tree harvesting apparatus 10 by a mounting member 16, to be discussed in greater detail hereinafter.

Turning to FIG. 2, shown is an enlarged view of the tree harvesting apparatus 10. As is known, the tree harvesting apparatus 10 includes a main body 18 having a central axis 20. The arrangement provides upper and lower fluid actuated gripping members 22, 24 and 26, 28 which are operable by identical fluid operated cylinders 30 associated with each gripping member although only one set of the fluid cylinders 30 is shown for members 24 and 28. It will be appreciated that identical cylinders are provided for the members 22 and 26. The fluid cylinders each include a piston 32 which is connected to a respective gripping member 22, 24, 26 and 28 via linkage 34.

A pair of rotatable compression rollers 38 (only one shown in FIG. 2) are disposed approximately centrally of the body 18. Rollers 38 frictionally engage and advance a tree (not shown) along the central axis 20 of the apparatus 10 as is well known in this art. During the advancement of the tree (not shown), gripping members 22, 24, 26 and 28 function to de-limb the tree. FIG. 3 illustrates a top partially cut away view of the arrangement 10 and as is illustrated, there is provided a selectively operable chain saw 80 movable from a storage position shown in chain line to a use position for cutting a tree. This will be discussed in greater detail hereinafter.

Main body 18 of apparatus 10 includes a first fluid cylinder 42 pivotally connected to a lower end of body 18 at 44. Cylinder 42 includes a piston 46 which is pivotally connected to a second identical cylinder 48, the piston 50 of which is pivotally mounted to a bracket 52, which bracket 52 is journalled about a rotary actuator 54, to be discussed in greater detail hereinafter. The piston 46 of cylinder 42 is commonly connected with cylinder 48 by a kicker linkage member 56. Kicker linkage member 56 is, in turn, pivotally connected to a flange 58 extending outwardly from body 18.

In greater detail with respect to the rotary actuator, the same preferably comprises a double helical spline arrangement that converts linear movement into torsional movement. As is known in the art, helical splines are machined on a shaft that has a sealed cylinder piston affixed thereon. When fluid pressure is applied to the piston, the same moves linearly and as the spline moves through an internally helical spline fixed collar, the piston and entire shaft also move torsionally. The helical spline systems are well known in the art and one such apparatus is manufactured by the Helac Corporation. The actuator 54 includes a further mounting 60. Mounting 60 is additionally pivotally linked to mounting member 58. Actuator 54 therefore extends between mounting member 60 and 16 and is mounted for pivotal motion relative to members 60 and 16. To this end, members 16 and 60 include large beating surfaces 62 and 64 to facilitate rotation. Mounting 60 may include a further connection site 64 for connection with ancillary connection means 66 associated with boom 14.

It has been found that by providing the rotary actuator 54, the entire harvesting arrangement 10 can be precisely controlled to cut a tree (not shown) in an upright position and moved in an arc. The use of the actuator 54 permits movement of the body 18 through a 220° arc. The axis of rotation of body 18 is parallel to the center line axis 20 of the tree processing head 10. In this manner, the tree harvesting arrangement is infinitely more manoeuverable to permit select cutting operations. As a further attendant advantage, since the operation can be selected by the operator, immature trees need not be knocked over, bent or otherwise destroyed while attempting to access the mature choice timber. Thus, the arrangement is useful to provide a cost effective procedure to fell choice timber dispersed amongst saplings, the saplings which would be otherwise destroyed by arrangements known in the art.

In use, the cooperation between cylinders 42 and 48 as well as kicker link 56 assist in movement of the apparatus 10 from the vertical disposition as illustrated in FIG. 2, to a position where the arrangement is horizontally disposed relative to the position shown in FIG. 2.

Although the fluid lines and other connections which achieve operation of the device are not shown, it will be readily appreciated by those skilled in the art that the apparatus is fluid actuated with respect to the mechanical components.

Figure 4:
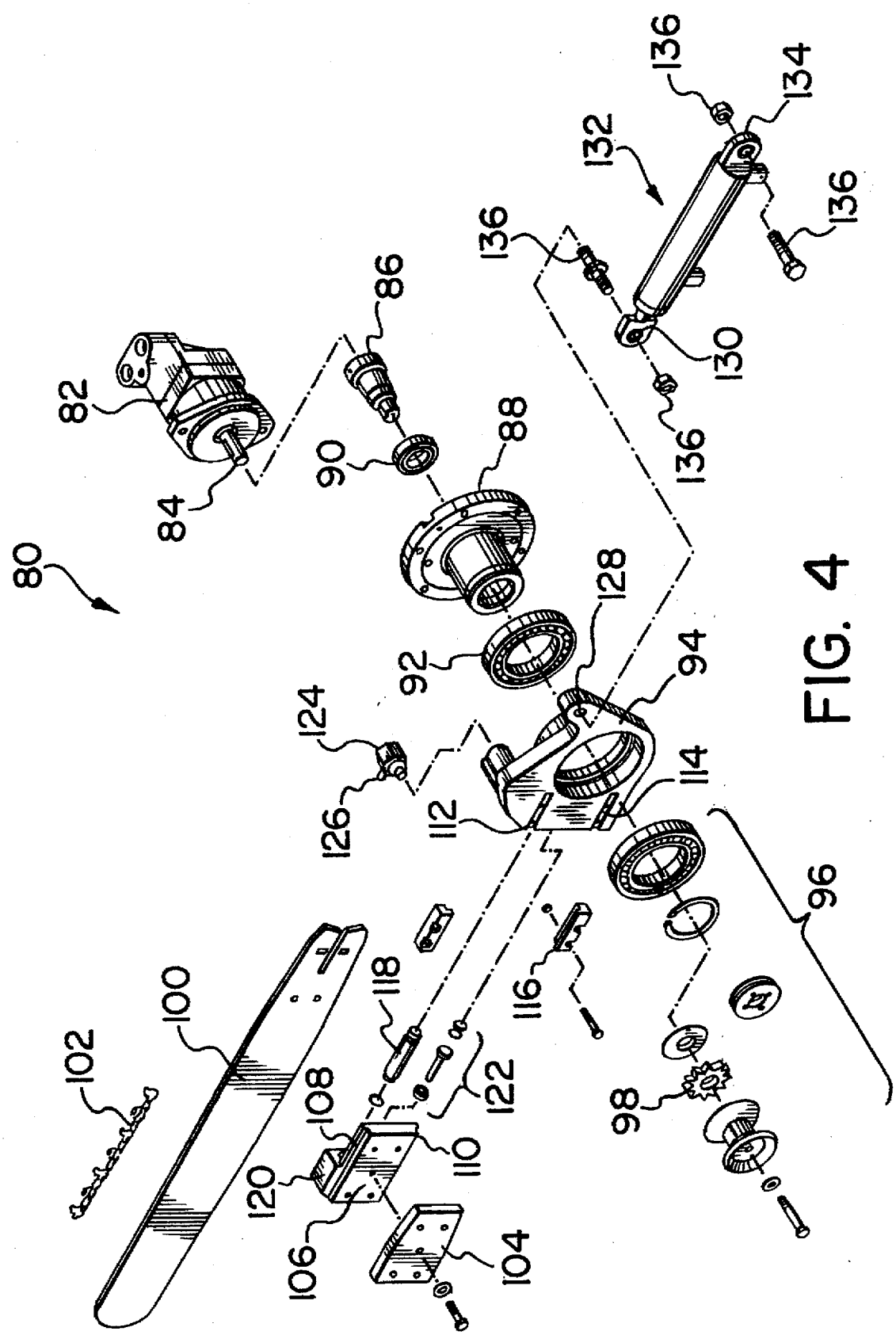
FIG. 4 is an exploded view of the chain saw system employed with the tree harvesting system according to the present invention.

Turning to FIG. 4, shown is an exploded view of the chain saw assembly employed in the present invention. The assembly, broadly denoted by numeral 80 includes a motor 82 within which is rotatably mounted a spindle 84 which receives drive shaft 86. Drive shaft 86 is rotatably mounted indirectly within a drive shaft housing 88 by a sealed bearing member 90. Sealed bearings 92 simply locate drive shaft housing 88 within housing 94. All of the foregoing members 82 through 92 are mounted to top pivot housing 94. The sprocket assembly, broadly denoted by numeral 96, includes sprocket 98 for driving the chain of the chain saw to be discussed hereinafter. By providing a sprocket assembly 96 as well as the bearing 90 and 92 as indicated previously, the result is that the sprocket 98 is indirectly connected to drive shaft 86 and supported by sealed bearing member 90 as opposed to being directly connected thereto. This has the distinct advantage of reducing side loads generated during a cutting procedure, side loads being generated by the chain of the chain saw. By making use of the indirect connection of the drive shaft 86 to sprocket 98, the side loads are absorbed and thus do not become translated to spindle 84 of motor 82. The result is longer motor life and further a motor which runs cooler and more efficiently.

In greater detail regarding the assembly 80, a typical saw bar 100 is provided with a saw chain 102 typically positioned around the perimeter of the saw bar 100. In the embodiment shown, saw bar 100 is fixedly secured between mounting block members 104 and 106. Block 106 has a shiplapped top 108 and a shiplapped bottom 110.

Figure 5:
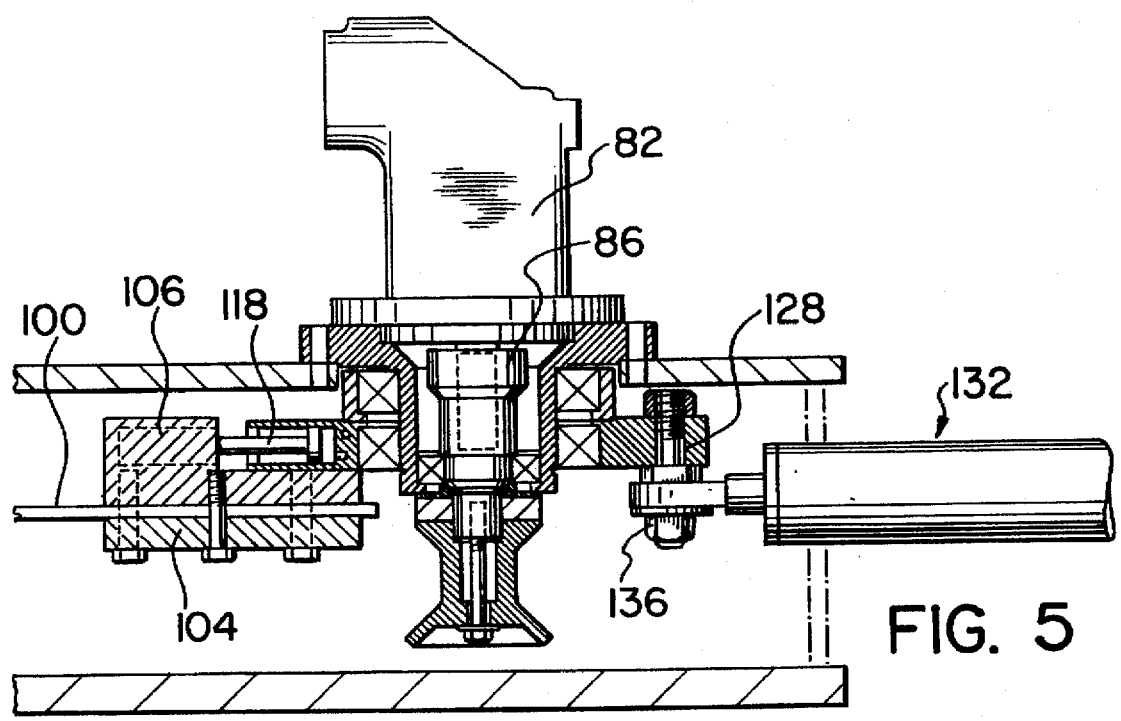
FIG. 5 is a longitudinal cross-section of the assembly shown in FIG. 4.
Figure 6:
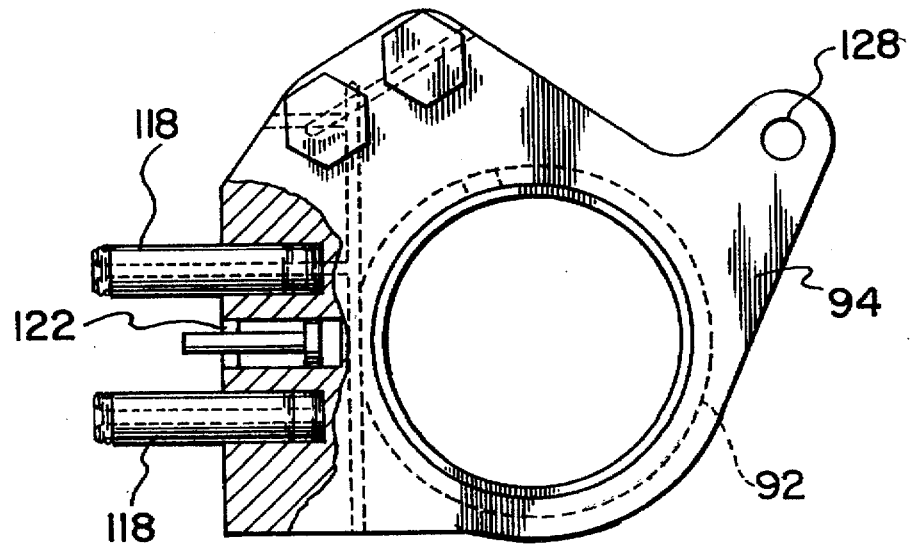
FIG. 6 is a partially cut away view of the chain saw pivot housing.

The saw pivot housing 94 includes a pair of spaced apart recesses 112 and 114, which recesses each receive identical shiplapped guide members 116, only one of which is shown in the illustration for purposes of clarity. Each of the guides 116 is shiplapped to cooperatively register with a respective shiplapping 108 and 110 of the block 106. In this manner, the saw bar 100 and more particularly the blocks 104, 106, mounting bar 100 are able to slide axially relative to the longitudinal axis of the saw bar 100 within pivot housing 94. The axially movement is facilitated by a pin arrangement 118 which extends from within block 106 in housing 120 thereof, and the pivot housing 94. Mounted in a parallel relationship with pin member 118, is a piston member 122. FIG. 5 illustrates a longitudinal cross-section of the assembled unit illustrating the various dispositions of the elements. FIG. 6 illustrates a partially cut away view of the saw pivot housing 94 illustrating a disposition of members 118 and 122.

Fluid to operate piston member 122 may be introduced into contact with piston member 122 via fluid fitting 124 connected to saw pivot homing 94 as illustrated. The output 126 of fitting 124 will be suitably connected to a source of fluid as is well known to those skilled in the art.

Housing 94 additionally provides an aperture 128, which aperture receives one end 130 of a double acting cylinder 132. The opposite end 134 of cylinder 132 will be connected to body 18 of assembly 10 as discussed herein previously with respect to FIG. 3. Suitable fasteners 136 will be employed to fasten the cylinder 132 to housing 128 and body 18 of assembly 10.

By making use of the piston member 122 and pin arrangement 118 controlled by a remote electrically operated hydraulic valve as set forth with respect to the embodiment in FIG. 4, the use of hand tools to tension the chain is circumvented. Typically, in the known art, the use of tools is required and accordingly, the arrangement set forth herein presents a significant advantage over known systems. Accordingly in the example, the chain 102 and the bar 100, can be changed very quickly by hand without tools. In operation, the saw bar 100 and the piston member 122 can be easily pushed in by hand toward housing 94 allowing the saw chain 102 to be removed. With the chain 102 removed, the saw bar 100 and blocks 104 and 106 can be slid off guides 116.

In order to change a chain 102 on bar 100, the operator simply flips a switch in the vehicle to the de-tension saw position. The switch is wired into a CPU that controls the assembly 10 so that it blocks all functions except the assembly 80. The operator can then use the usual controls that operate the saw assembly 80 to bring out the saw from its storage position. Simultaneously, the switch sends a signal to the valve that diverts pressure from the member 122 so that the saw is detensioned and ready to be pushed back.

The operator can then work at the saw to change the saw bar or chain. When it is desired to resume operation of the saw, the switch is simply switched to a tension mode and this allows all functions of the harvesting assembly to be operational and the saw bar 100 to be retracted into the storage position.

As will be readily appreciated by those skilled in the art, this system significantly expedites changing of the saw bar and/or chain directly in the field by the operator in the absence of multiple step procedures, tools, etc.

It is particularly advantageous to combine this feature with the novel tree harvesting assembly set forth herein previously to provide a much more efficient and manoeuverable system.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A chain saw comprising:

a chassis;

a saw bar extending from said chassis;

a saw chain positioned about said saw bar;

adjustable tensioning means for adjustably effecting axial movement of said bar relative to said chassis to adjust the tension of said saw chain on said saw bar; and fluid control valve means operatively connected to said tensioning means to actuate said tensioning means.

2. The chain saw as set forth in claim 1, wherein said tensioning means provides constant axial force.

3. The chain saw as set forth in claim 1, wherein said tensioning means includes at least one block for fixedly securing said saw bar.

4. The chain saw as set forth in claim 3, wherein said block includes grooves.

5. The chain saw as set forth in claim 4, wherein said chassis includes guide means, said guide means for receiving said grooves of said blocks for preventing perpendicular motion of said saw bar in said chassis.

6. The chain saw as set forth in claim 1, wherein said flow control valve means is positioned between said tensioning means and said chassis.

7. The chain saw as set forth in claim 6, wherein said flow control valve means comprises electrically operable hydraulic direct control valve means.

8. The chain saw as set forth in claim 6, further including pin means for extending between said tensioning means and said chassis.

9. The chain saw as set forth in claim 1, wherein said chain saw includes a motor having an output shaft, a sprocket and a drive shaft, said drive shaft being directly connected to said sprocket by bearing means.

10. A chain saw as set forth in claim 1, in combination with a tree harvesting system.

11. A tree harvesting system for felling and shaping trees, said apparatus attachable to the end of a support arm, comprising:

a main processing head for felling and shaping a tree;

a mounting member connected to said main processing head; and selectively pivotal linkage means comprising a double helical spline actuator extending between said main processing head and said mounting member, said actuator operable for selective pivotal movement of said main processing head about an axis parallel to said main processing head;

means for connection of said apparatus to a source of fluid.

12. A chain saw as set forth in claim 11, wherein said apparatus further includes a first flow cylinder and a first piston connected to said main processing head, a second fluid cylinder and second piston connected to said actuator, said first piston and said second cylinder commonly connected to a main processing head linkage member connected to said main processing head.

13. A chain saw as set forth in claim 12, wherein said main processing head includes releasable tree gripping means, means for advancing said tree relative to said main processing head and means for de-limbing said tree.

14. A tree harvesting system, comprising:

a main tree processing head having a central axis and means adapted for connection of said head to a vehicle;

said main processing head including:
tree gripping means;
tree de-limbing means;
means for advancing a tree relative to said main processing head;
selectively operable chain saw cutting means mounted to a chassis on said main tree processing head;
said chassis having a saw bar and a saw chain therearound;
tensioning means for moving said saw bar relative to said chassis to effect tensioning of said saw chain;
fluid control valve means operatively connected to said tensioning means to effect movement of said saw bar;
a mounting member connected to said main processing head; and
selectively operable pivotal linkage means extending between said main processing head and said mounting member, said linkage means selectively operable to effect pivotal movement of said main processing head about an axis parallel to said central axis of said main processing head; and means for connection of said main processing head to a source of fluid.

15. The tree harvesting system as set forth in claim 14 in combination with a vehicle, said vehicle connected to said means for connection of said main processing head.

16. The tree harvesting system as set forth in claim 14, wherein said chain saw cutting means includes at least one double acting cylinder to effect movement from a storage position on said tree harvesting system to a use position for cutting a tree.

* * * * *